Feb. 14, 1933.  G. W. DOOLEY  1,897,945
UNIVERSAL JOINT
Filed Dec. 26, 1929
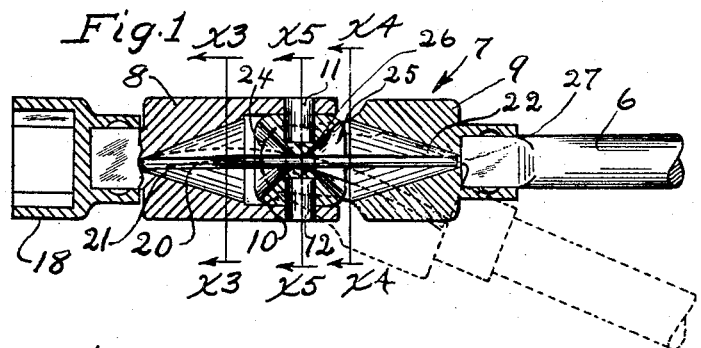
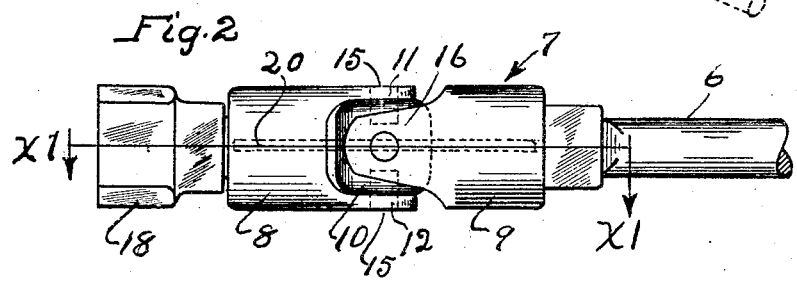
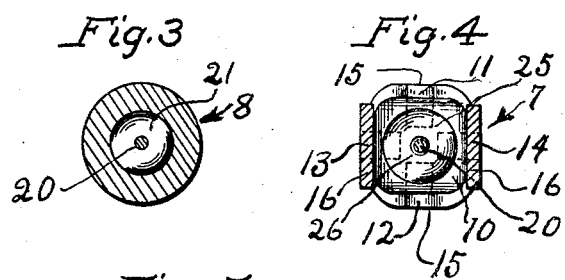
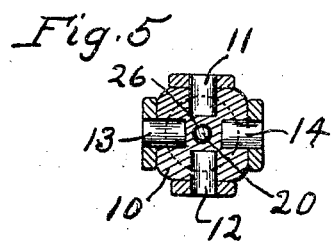
INVENTOR
George W. Dooley Patented Feb. 14, 1933

1,897,945

UNITED STATES PATENT OFFICE

GEORGE W. DOOLEY, OF SAN BERNARDINO, CALIFORNIA

UNIVERSAL JOINT

Application filed December 26, 1929. Serial No. 416,694.

This invention relates generally to speed wrenches and the like using a flexible universal joint connecting the socket member and the handle member so that they may be worked at an angle to each other, and has more particular reference to a novel type of universal joint constructed to have a spring stiffener contained within itself to normally hold the joint members in alignment with each other.

Another object of the present invention is to provide a stiffener element that does not have to be placed on the outside of the universal joint, therefore it does not add to the outside diameter of the joint, this feature being an advantage when using it in close places.

Other advantages are the saving of material and cost of manufacture, as the present invention requires only a short length of straight spring wire to normally hold the joint members in alignment.

Other objects, advantages and features of invention may appear from the accompanying drawing, the subjoined detailed description and the appended claims.

The accompanying drawing illustrates the invention.

Figure 1 is a sectional view of a universal joint, constructed in accordance with my invention, taken on line $X_1$ of Fig. 2, the length of spring wire and fragment of handle rod showing in full, dotted lines showing the spring in a bowed shape as it will be when the socket end is bent out of alignment with the handle end which is also shown in dotted lines while in bent position.

Fig. 2 is a side view showing a fragment of a handle rod attached to one end, and a socket head attached to the other end, and the spring wire stiffener shown in dotted lines.

Fig. 3 is section of Fig. 1 on lines $x3$ showing the conical shaped depressions, the bottom or small end of which loosely fits the ends of the spring 20.

Fig. 4 is a section of Fig. 1 on line $x4$ showing the conical depressions in the pivot block 10 which lead from either side to the hole 26 through the block.

Fig. 5 is a section on line $x5$ of Fig. 1 showing the swivel pins 11—12—13 and 14.

Referring more particularly to the drawing, 6 indicates a wrench handle to which a universal joint 7 is attached, the universal joint 7 is comprised of the members 8 and 9 and held in pivotal relation to each other by means of a block 10 which receives the pivot pins 11—12—13 and 14 which extend through the ears 15 and 16 of the members 8 and 9.

As is well known in this type of tool the squared end of the wrench handle fits into one of the joint members as 8 while the other member 9 is adapted to receive a socket head, as 18, which is best shown in Fig. 1, 20 indicates a spring, preferably a length of spring steel wire circular in cross-section, the ends of which terminate in the bottom, or small ends, of the conical shaped recesses 21 and 22 formed within the members 8 and 9.

The block 10 has a comparatively small hole 26 through it connecting the conical shaped depression 24 and 25 to allow the spring 20 to pass through and be fulcrumed at this point when the members 8 and 9 are out of alinement.

In order that the fulcrum joint in the swivel block 10 may be as sharp as posisble to allow the spring 20 to bend as a bow without excessive binding at this point, the sides of the swivel block 10 have conical shaped depressions 24 and 25 leading to the small hole 26, the tapering or conical shaped holes 21 and 22 in the joint members 8 and 9 are also for the purpose of allowing the spring 20 to bend in a bow without binding and to allow the pressure that tends to bend the spring 20 to come at, or near, its ends and middle.

The conical shaped depression 22 of the joint member 9 is preferably bored through at 27 to meet the squared hole that receives the squared end of the handle 6 so that by separating the handle 6 from the joint member 9 the spring member 20 may be withdrawn from the universal joint for any reason, such as to replace with a new one, without further disturbing the assembly of the universal joint as a whole.

The pivot pins 11—12—13 and 14 of the pivot block 10 are shown, for convenience, as a pressed fit into the block 10 but may be screwed in, or otherwise held into place, or the pivot pins and block may be formed as an integral part, in this case the pivot block may be formed thin enough to eliminate the necessity of the conical shaped depressions as are now shown in the block 10.

It is obvious that other minor changes in the present showing may be made without departure from the spirit of my invention.

I claim:

1. In a universal joint, a pivotal block having conical depressions on two of its faces, a passage way joining said depressions, end members of said universal joint being taperingly depressed to receive a spring stiffener fulcrumed within said passage and having its ends fitted to the bottom of said depressions in said end members.

2. In a universal joint having its end members pivotally joined by a pivot block and pivot pins, a pivot block pierced to allow a length of spring wire to pass horizontally through it, and end members shaped to closely receive the extreme ends of said spring wire, said pivot block and end members also being shaped to allow free action of said spring wire at all other points except its extreme ends and a point at or near its center.

3. A universal joint having its opposing members recessed at their inner ends and having a pierced pivot block with conical depressions facing said opposing members, a resilient member adapted to have its ends fitted within said recesses, and fulcrumed through said pierced pivot block.

In testimony whereof, I have hereunto affixed my signature this 19 day of December, 1929.

GEORGE W. DOOLEY.